(12) United States Patent
Takhim

(10) Patent No.: US 8,951,587 B2
(45) Date of Patent: Feb. 10, 2015

(54) MINERAL ADDITIVE FOR A DIETARY COMPOSITION FOR ANIMALS AND METHOD FOR THE PRODUCTION THEREOF

(75) Inventor: Mohamed Takhim, Louvain-la-Neuve (BE)

(73) Assignee: Ecophos, Louvain-la-Neuve (BE)

( * ) Notice: Subject to any disclaimer, the term of this patent is extended or adjusted under 35 U.S.C. 154(b) by 924 days.

(21) Appl. No.: 11/990,307

(22) PCT Filed: Aug. 9, 2006

(86) PCT No.: PCT/EP2006/065179
§ 371 (c)(1),
(2), (4) Date: Feb. 11, 2008

(87) PCT Pub. No.: WO2007/017517
PCT Pub. Date: Feb. 15, 2007

(65) Prior Publication Data
US 2009/0053356 A1    Feb. 26, 2009

(30) Foreign Application Priority Data
Aug. 10, 2005    (BE) .................................... 2005/0390

(51) Int. Cl.
*A23L 1/304*      (2006.01)
*A23K 1/175*      (2006.01)

(52) U.S. Cl.
CPC .................................. *A23K 1/1755* (2013.01)
USPC ................................................ 426/74; 426/2

(58) Field of Classification Search
CPC ... A23K 1/1755; A23K 1/1751; A23K 1/186; A23K 8/55; A23K 8/61
USPC ........................................................ 426/74, 2
See application file for complete search history.

(56) References Cited

U.S. PATENT DOCUMENTS

| | | | | | |
|---|---|---|---|---|---|
| 2,722,472 | A | * | 11/1955 | Le Baron | 423/166 |
| 2,906,602 | A | * | 9/1959 | Purvis | 423/165 |
| 2,933,372 | A | * | 4/1960 | Manning | 423/321.1 |
| 2,992,914 | A | * | 7/1961 | Manning et al. | 71/40 |
| 3,489,510 | A | * | 1/1970 | Betts | 423/164 |
| 3,988,420 | A | | 10/1976 | Loewy et al. | |
| 4,154,800 | A | | 5/1979 | Cannon et al. | |
| 4,222,990 | A | * | 9/1980 | Drechsel | 423/158 |
| 4,376,129 | A | * | 3/1983 | Piukovich et al. | 426/64 |
| 2004/0013594 | A1 | | 1/2004 | Takhim | |
| 2006/0189483 | A1 | * | 8/2006 | Hickok | 504/116.1 |
| 2007/0166217 | A1 | | 7/2007 | Takhim | |

OTHER PUBLICATIONS

"Calcium Dihydrogen Phosphate", product sheet, http://factory.dhgate.com/animal-feed/calcium-dighydrogen-phosphate-p37073762.html, pp. 1-4, 2004-2012.*

(Continued)

*Primary Examiner* — Helen F Heggestad
(74) *Attorney, Agent, or Firm* — Dykema Gossett PLLC

(57) ABSTRACT

The invention relates to an additive mineral for a dietary composition for animals comprising, in a biodigestible form, at least one phosphoric acid salt and a compound capable of forming a salt therewith. The additive is in the form of an aqueous solution in which the salt is in a dissolved state and is provided in the form of phosphate ions and of ions of said compound. The invention also relates to a method for producing the additive and to a device for carrying out this method.

13 Claims, 2 Drawing Sheets

(56) References Cited

OTHER PUBLICATIONS

//www.alibaba.com/countrysearch/CN?animal-feed-monocalcim. htlm, pp. 1, and 17, 1999-1912, product p . . .*

$46^{TH}$ JECFA (1996), "Calcium Dihydrogen Phosphate", NMRS 40, pp. 1 and 2.*

Jones, F. T. A Broad View of Arsenic, pp. 1-14, 2007 Poultry Science Association, Inc.*

Von Liebig, Monocalcium phosphate, http://en.wikipedia.org/wiki/Monocalcium_phosphate, Wikepedia , 2013, pp. 1-2.*

* cited by examiner

MINERAL ADDITIVE FOR A DIETARY COMPOSITION FOR ANIMALS AND METHOD FOR THE PRODUCTION THEREOF

BACKGROUND OF THE INVENTION

1. Field of the Invention

The present invention relates to a mineral additive for a food composition intended for animals, comprising, in biodigestible form, at least one phosphoric acid salt and a compound capable of forming a salt with it.

2. The Prior Art

In order to prepare food compositions for animals, it is known in general terms how to add a phosphate in the dry state to a base substance forming the food, for example maize, oils, wheat, etc. The preparer uses for example salts in the form of calcium, sodium and/or ammonium phosphate in the solid state, in powder form or in the form of granules. These solid salts are purchased by the preparer from their manufacturers, who produce them in workshops specifically designed for this purpose.

One drawback of the known method is that the preparation of phosphate, for example calcium, in the dry state is a method that not only requires a large quantity of energy but also does not allow manufacture in small quantities. In addition, the use of calcium phosphate in the dry state gives practically no flexibility to the preparer of the food since it does not make it possible to take account of the composition of the base substance.

Food additives based on phosphates in the solid state also pose problems of bioavailability for the animal organism, which then excretes large quantities of undigested phosphorus, which poses environmental problems.

The aim of the present invention is to develop a mineral additive for a food composition for animals that gives great flexibility to the preparer and that can be prepared in small quantities in a simple manner, whilst being extremely well absorbable by the animals.

SUMMARY OF THE INVENTION

To resolve this problem, there has been provided, according to the invention, a mineral additive as indicated at the start, which is in the form of an aqueous solution in which the said at least one salt is in the dissolved state and is in the form of phosphate ions and ions of the aforementioned compound. In such an additive, the phosphorus is in the completely water-soluble state, thus to say its bioavailability (92% instead of 72% for a phosphate in the dry state) for the organism of the animal will make it possible to reduce the specific consumptions of phosphate product and the excretions of undigested phosphorus. It is not necessary to proceed with steps of drying and/or extruding the phosphate. In addition, the liquid form of the product facilitates dosing in the food for animals.

Advantageously, the phosphate ions are chosen from the group consisting of orthophosphate, monohydrogenphosphate and dihydrogenphosphate and mixtures thereof, preferable dihydrogenphosphate ions. Preferably the compound capable of forming a salt with phosphoric acid is chosen from the group consisting of sodium, calcium and ammonia. The aqueous solution forming the additive can also contain phosphoric acid in addition.

The mineral additive according to the invention has a pH adjustable according to a ratio between compound capable of forming a salt with phosphoric acid and P established in the aqueous solution, in particular the ratio Ca/P or Na/P.

According to an improved embodiment of the invention, the additive consists of an aqueous solution of calcium dihydrogenphosphate having $P_2O_5$ content greater than 18% by weight, preferably equal to or greater than 20% by weight.

The invention also concerns a food composition for animals containing at least one base food substance and at least one mineral additive according to the invention, as well as possibly other usual food additives, known to persons skilled in the art.

The present invention also relates to a method of preparing a mineral additive according to the invention, in particular a clear aqueous solution of calcium dihydrogenphosphate (MCP).

According to one embodiment of the invention, the method comprises a solubilisation in water of a triple superphosphate (TSP) with the formation of a pulp consisting of an aqueous phase containing calcium phosphate in solution in water in the form of calcium ions and phosphate ions and a solid phase containing impurities, and a separation between the said solid phase and the aqueous phase forming the said mineral additive. A solubilisation in water of TSP has already been described for example in international patent application WO 2005/066071.

According to another embodiment of the invention, the method comprises an attack on a phosphate ore by a phosphoric acid with the formation of a pulp consisting of an aqueous phase containing calcium phosphate in solution in water in the form of calcium ions and phosphate ions and a solid phase containing impurities and a separation between the said solid phase and the aqueous phase forming the said mineral additive.

According to yet another embodiment of the invention, the method comprises a mixing of phosphoric acid with an aqueous solution of calcium hydroxide, a formation of a precipitate of calcium monohydrogenphosphate (DCP) and a separation between the precipitate and a clear solution of calcium dihydrogenphosphate (MCP) forming the said mineral additive.

According to an advantageous embodiment of the invention, the method comprises a mixing of phosphoric acid with an aqueous suspension of calcium hydroxide, a formation of a first precipitate of calcium monohydrogenphosphate (DCP), a separation between the first precipitate and an aqueous solution of calcium dihydrogenphosphate (MCP), an addition to this aqueous solution of a strong base and a separation between a second precipitate and a clear solution of calcium dihydrogenphosphate (MCP), forming the said mineral additive.

According to a preferred embodiment of this invention, the method comprises a mixing of a liquor based on phosphoric acid and calcium dihydrogenphosphate (MCP) with an aqueous suspension of calcium hydroxide and a strong base, a formation of a first precipitate of calcium monohydrogenphosphate (DCP), a first separation between this first precipitate and a liquid phase, a mixing of this first precipitate with fresh phosphoric acid, a formation of a second precipitate and a second separation between the second precipitate and a liquid phase consisting of the said liquor, the said liquid phase issuing from the first separation being a clear solution of calcium dihydrogenphosphate (MCP) forming the said mineral additive.

The aforementioned strong base is preferably alkali metal hydroxide, in particular sodium hydroxide, advantageously at a concentration of around 45-55% by weight. The phosphoric acid used is advantageously a previously defluorinated phosphoric acid (DPA), having in particular a $P_2O_5$ content of 35-55% by weight, preferably 50-55% by weight.

The invention also relates to a method of preparing a food composition for animals according to the invention, this method comprising a determination of the pH of the said base substance, a prediction of a predetermined pH to be achieved for the food composition, a preparation of the said mineral additive according to the invention so that it has a pH such that, when the mineral additive is added to the base substance, the said predetermined pH is obtained for the food composition.

The liquid form of the mineral additive allows precise dosing thereof in the base substance of the food. In addition, it is easy to control the pH and the P/Ca++, P/Na+ and P/NH3 ratios. This therefore makes it possible to very easily achieve the aforementioned predetermined pH that suits the food conditions required by the preparer.

The invention also concerns a device for implementing the mineral additive preparation method according to the invention. This device preferably being mounted on a mobile unit.

The invention also concerns a use of a mineral additive according to the invention for producing foods for animals.

Other particularities of the invention are indicated in the accompanying claims.

Other details of the invention will emerge from the description given below and the accompanying drawings.

DETAILED DESCRIPTION OF THE PREFERRED EMBODIMENT

The method according to the invention for preparing a food for animals comprises the preparation of an additive according to the invention containing phosphate and at least one of the cationic components chosen from salts or bases, in particular calcium, sodium or ammonium. The method also comprises the use of a base substance, for example formed by maize, oils, wheat, etc. According to the method of the invention the pH of the base substance is determined and the pH of the said food is predetermined. The phosphate is prepared in the form of a solution, the pH of which is such that, when the phosphate is added to the base substance, the said predetermined pH is obtained for the food.

The additive is therefore formed by a phosphate solution. This solution has a pH situated between 0.5 and 7.5. The fluorine and the heavy metals in the additive do not exceed the limits of the market standards. The preparer will fix the pH of the solution according to his requirements and the considerations of his food composition formula.

The advantage of this way is that the phosphorus is completely soluble in water, which offers better assimilation by the organism of the animal. The clear solutions can have a concentration of more than 18%, preferably more than 20% of $P_2O_5$. This solution may contain, in addition to the phosphate ions, Na+, NH4+ and Ca++ cations.

The phosphorus preferably has the following forms: $H_3PO_4$, $H_2PO_4-$, $HPO_4--$, $PO_4---$ and in particular $H_2PO_4-$.

The device for synthesising this additive may, in its simplest form, amount to a mixer supplied by flows dosed by appropriate dosing systems put in line with a solid/liquid separation system.

The pH and the temperature, as well as the concentration of the mixture possibly measured by a densimeter, will serve as control parameters for the indicators that fix the ratios of the mixing of the various flows of the method.

The method according to the invention will now be described in more detail by means of non-limitative example embodiments set out below.

Example 1

100 g of sodium carbonate is fed to a stirred reactor into which an attack liquid containing phosphate ions is also introduced, for example defluorinated H3PO4 (also referred to as DPA). The sodium carbonate advantageously has an Na2CO3 content of 98% by weight, while the phosphoric acid has a P2O5 content of around 30-40% by weight. The digestion conditions are established so as to adjust the pH according to the wishes of the consumer in order to meet his food formulation requirements.

Figure 3:
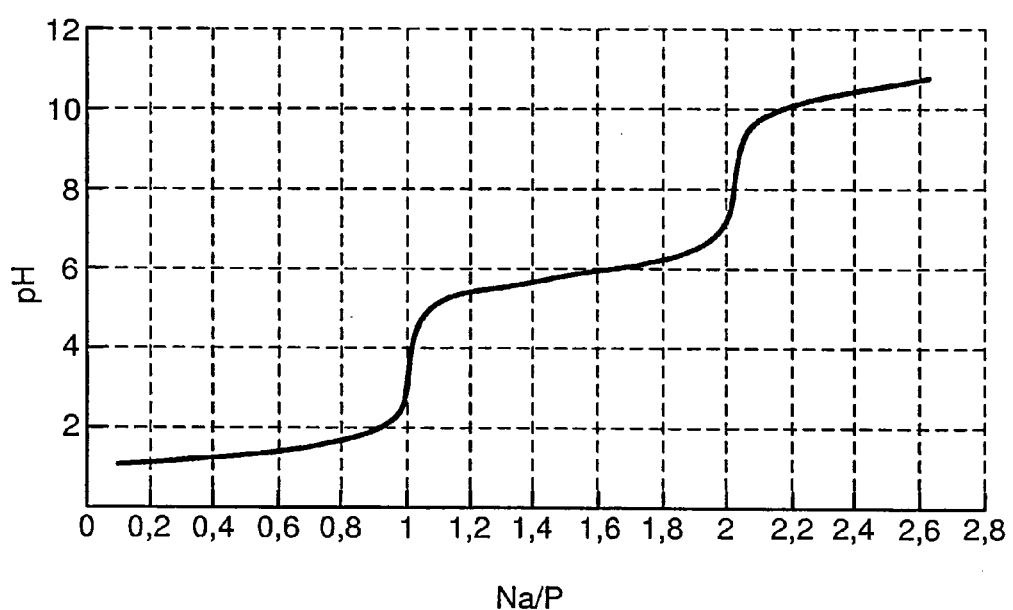
FIG. 3 illustrates the variations in pH according to the Na/P ratio in an aqueous solution of NaOH/H3/PO4.

The mixture obtained will have a pH that can vary according to the Na/P ratio practised, as illustrated in FIG. 3. The curve shows the change in the pH of the mixture as a function of this ratio.

Example 2

Figure 1:
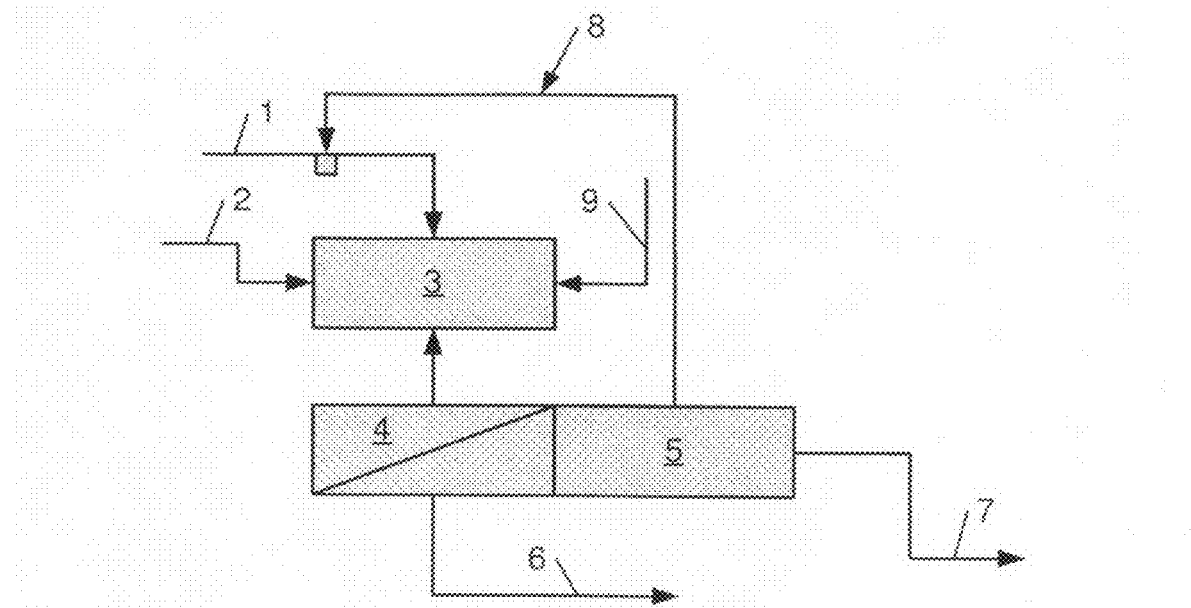
FIGS. 1 and 2 depict two variant embodiments of devices for preparing a mineral additive according to the invention.

As illustrated in FIG. 1, 100 g of a phosphate ore, preferably ground, is treated in a mixer 3 with a solution of fertiliser-quality phosphoric acid 1 that has a concentration of P2O5 of around 35-45% by weight.

The digestion advantageously takes place at ambient temperature and pressure. A higher temperature, ranging up to 80° C. for example, can obviously be provided. The CO2 present in the ore in the form of carbonate is released during the reaction through an outlet 9. The pulp formed is conducted to a solid/liquid separation device 4 so as to eliminate the insolubles where the major part of the impurities (fluorine/silica) are found. The solid phase is subjected to washing with water in a washing device 5. During filtration the pH is in particular 2-3. At this high pH, the majority of the heavy metals forming the impurities precipitate, with the exception of the MCP. The filtration cake washing water 8 is possibly recycled in order to dilute the phosphoric acid 1 used for treating the ore. The clear solution of MCP 6 (380 g) is used directly as the mineral additive according to the invention. The washed residue of the insolubles is discharged through the pipe 7.

Example 3

Into a reactor there is introduced 100 g of DPA at a P2O5 concentration of 54% which has been diluted with 28 g of water, and 150 g of milk of lime, this aqueous suspension containing a Ca(OH)2 content of 20% by weight. After 30 minutes of intense agitation of this mixture the suspension formed contains 27 g of solid matter consisting for the major part of DCP. The pH of the suspension is approximately 1.7.

After a solid/liquid separation step performed on this suspension, for example by filtration or centrifugation or any other suitable separation operation, a clear solution of MCP is obtained having a P2O5 content of 18% by weight and a fluorine content of only 316 ppm. Approximately 80% by weight of the initial P2O5 is recovered in the clear solution of MCP, which will serve as the mineral additive according to the invention.

Example 4

Into a reactor 400 g of DPA is introduced at a concentration of 54% of P2O5 by weight, in a non-dilute form, and 600 g of milk of lime having a Ca(OH)2 content of 20% by weight. After 30 minutes of agitation, the suspension contains 125 g of solid matter consisting for the major part of DCP. The pH of the suspension is approximately 1.7.

After a solid/liquid separation step performed on the suspension, an aqueous solution containing 80% by weight of the initial P2O5 is obtained.

To the aforementioned aqueous solution there is added, in a second step of the method, 30 g of sodium hydroxide in aqueous solution at a concentration of 50% by weight of NaOH. The mixture is stirred for another 30 minutes until the reaction is complete. The pH of the suspension obtained reaches approximately 2.4. The solid matter content is now 25 g, which makes a total of 150 g of solid matter in theory.

A second solid/liquid separation step is then performed, which is performed on the suspension of the second step of the method. 25 g of solid residues is obtained, expressed as dry matter. A clear solution of MCP is obtained with a P2O5 content of 20.3% by weight and a fluorine content of approximately 300 ppm.

Example 5

Figure 2:
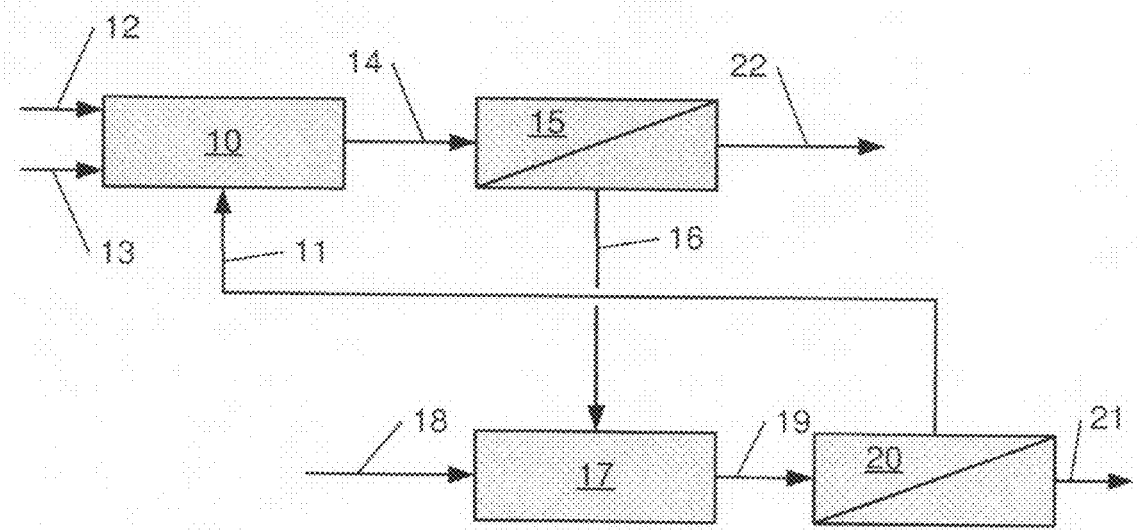

As illustrated in FIG. 2, in a first step, a liquor based on DPA and MCP that comes from a second step of the method implemented is introduced at 11 into a first reactor 10. In this same reactor, 30 g of NaOH at 50% by weight is introduced at 12 and 600 g of milk of lime at 20% by weight at 13.

After intense agitation a suspension is obtained that is discharged through the pipe 14 into a solid/liquid separation device 15. The solid precipitate (125 g), consisting for the major part of DCP, is returned through the pipe 16 into a second reactor 17 of the aforementioned second step.

Into this second reactor, 400 g of fresh DPA having a P2O5 content of 54% by weight is introduced at 18. After intense mixing, a suspension is obtained that is transferred through the pipe 19 to a solid/liquid separation device 20. The precipitate consists of 25 g of dry matter that is eliminated at 21, while the liquor with this solid matter removed is, as indicated above, recycled to the first reactor 10 through the pipe 11.

The liquid phase issuing from the separator 15 is discharged from it through the pipe 22. It consists of a clear aqueous solution of MCP (1005 g) that has a P2O5 content of 20.3% by weight.

In this counterflow method and in two steps, 94% by weight of the P2O5 introduced, or even more, is recovered overall in the MCP solution.

In order to be economically profitable the conventional methods require a minimum capacity. Because of their complexity and the multitude of physical and chemical operations that make them up, the size of the devices used is great. These are immobile units producing for more than one customer, or even for the external market.

These units are fixed on a site with a specific structure and organisation.

On the other hand, with the technology according to the invention and the novel concept of supplying with phosphorus it is possible to envisage the installation at the preparer of a device for producing phosphate salt solutions. Having regard to the large production capacity of this system, small units fixed at the customer or movable over a wide geographical area are entirely envisageable. A mobile unit of this type can generate more than 100 kt/year of MCP product, that is to say >12 kt/hour.

It must be understood that the present invention is in no way limited by the examples given above and that many modifications can be made thereto within the scope of the accompanying claims.

The invention claimed is:

1. A mineral additive for a food composition intended for animals, comprising, in biodigestible form, an aqueous solution of calcium dihydrogenphosphate having a $P_2O_5$ concentration greater than 18% by weight wherein said calcium dihydrogenphosphate solution is in a dissolved state and is in the form of dihydrogenphosphate ions and calcium ions.

2. The mineral additive according to claim 1, wherein the aqueous solution also contains phosphoric acid in a dissolved state.

3. The mineral additive according to claim 1, having a pH adjustable according to a ratio Ca/P.

4. Food composition for animals containing at least one base food substance and at least one mineral additive according to claim 1.

5. A method of preparing a food composition for animals according to claim 4, comprising determining pH of the said base substance, predicting a predetermined pH to be achieved for the food composition, and preparing the mineral additive so that it has a pH such that, when the mineral additive is added to the base substance, the predetermined pH is obtained for the food composition.

6. Method of preparing a mineral additive according to claim 1, comprising dissolving in water a triple superphosphate (TSP) with the formation of a pulp consisting of an aqueous phase containing calcium phosphate in solution in water in the form of calcium ions and phosphate ions and a solid phase containing impurities, and separating the solid phase and the aqueous phase forming the mineral additive.

7. Method of preparing a mineral additive according to claim 1, comprising attacking a phosphate ore by a phosphoric acid with the formation of a pulp consisting of an aqueous phase containing calcium phosphate in solution in water in the form of calcium ions and phosphate ions and a solid phase containing impurities, and separating the solid phase and the aqueous phase forming the mineral additive.

8. Method of preparing a mineral additive according to claim 1, comprising mixing phosphoric acid with an aqueous suspension of calcium hydroxide, forming a precipitate of calcium monohydrogenphosphate (DCP), and separating the precipitate and a clear solution of calcium dihydrogenphosphate (MCP) forming the said mineral additive.

9. A method of preparing a mineral additive according to claim 1, comprising mixing phosphoric acid with an aqueous suspension of calcium hydroxide, forming a first precipitate of monohydrogenphosphate (DCP), separating the first precipitate and an aqueous solution of calcium dihydrogenphosphate (MCP), adding a strong base to this aqueous solution, and separating a second precipitate and a clear solution of calcium dihydrogenphosphate (MCP) forming the said mineral additive.

10. A method of preparing a mineral additive according to claim 1, comprising mixing a liquor based on phosphoric acid and calcium dihydrogenphosphate (MCP) with a aqueous suspension of calcium hydroxide and a strong base, forming a first precipitate of calcium monohydrogenphosphate (DCP), separating this first precipitate and a liquid phase, mixing this first precipitate with fresh phosphoric acid, forming a second precipitate, and separating the second precipitate and a liquid consisting of the said liquor, the liquid phase issuing from the first separation being a clear solution of calcium dihydrogenphosphate (MCP) forming the said mineral additive.

11. A method according to claim 10, wherein the phosphoric acid is a defluorinated phosphoric acid.

12. A method according to claim 11, comprising recovering $P_2O_5$ content in the clear solution of calcium dihydrogenphosphate forming the mineral additive that is greater than 80%.

13. The mineral additive according to claim 1, consisting of said aqueous solution of calcium dihydrogenphosphate.

* * * * *